Nov. 17, 1964  E. F. HEISER  3,157,095
PISTON AND CYLINDER DEVICE
Filed April 12, 1962  2 Sheets-Sheet 1
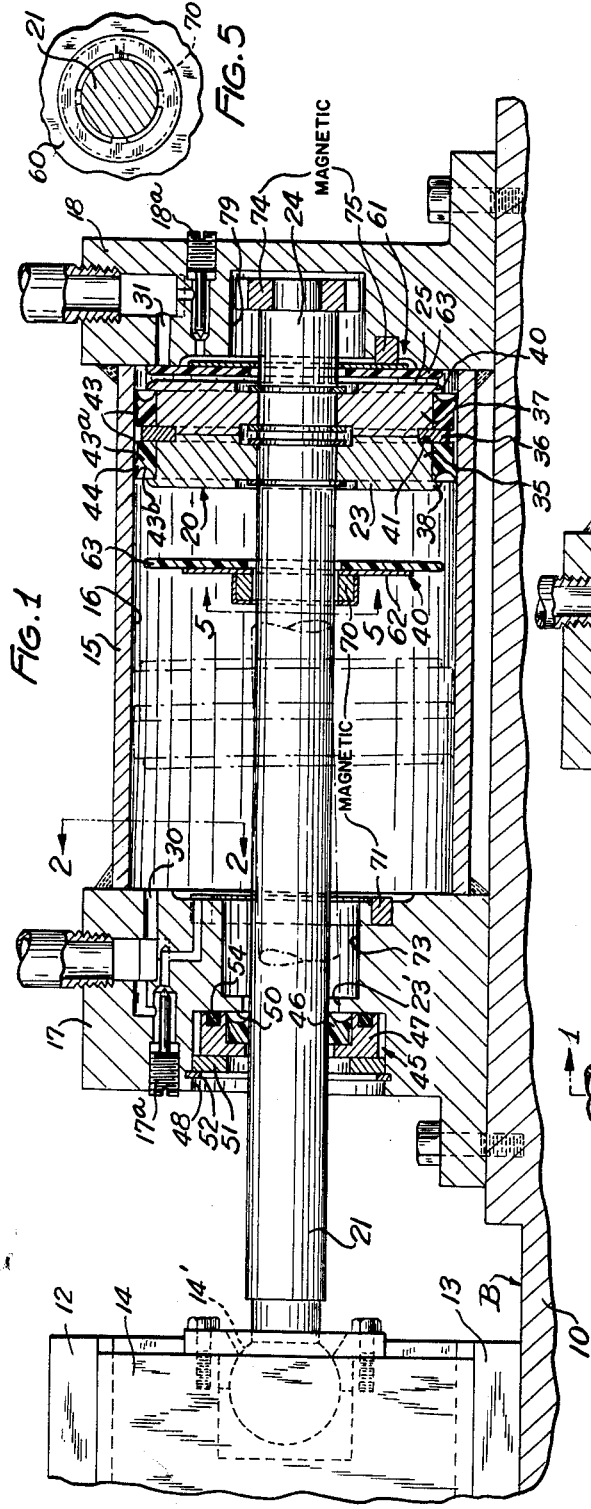
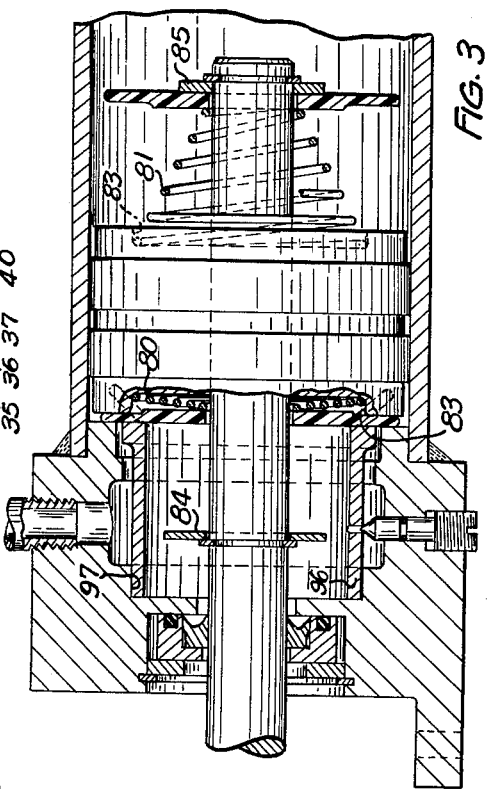
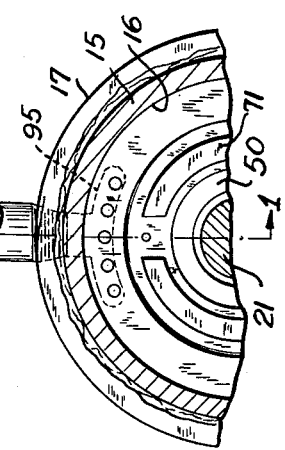
INVENTOR.
ELMER F. HEISER
BY Williams, David,
Hoffmann & Yount.
ATTORNEYS Nov. 17, 1964     E. F. HEISER     3,157,095
PISTON AND CYLINDER DEVICE
Filed April 12, 1962     2 Sheets-Sheet 2

INVENTOR.
ELMER F. HEISER
BY Williams, David,
Hoffmann & Yount
ATTORNEYS

United States Patent Office 3,157,095
Patented Nov. 17, 1964

3,157,095
PISTON AND CYLINDER DEVICE
Elmer F. Heiser, 5880 Lotusdale Drive,
Parma Heights, Ohio
Filed Apr. 12, 1962, Ser. No. 187,070
4 Claims. (Cl. 91—395)

The present invention relates to a piston and cylinder device of the type including a cylinder having an axially extending bore with a piston head movable axially therein and a piston rod supported at its inner end by the piston head and movable with the piston head.

Piston and cylinder devices are commonly associated with machine members which are relatively movable along a line of movement. Normally the cylinder of a piston and cylinder device associated with relatively movable machine members is rigidly secured to one of the machine members and the outer end of the piston rod is connected to the other machine member. The point of contact between the outer end of the piston rod and the member engaged thereby tends to move along the line of movement of the relatively movable members, while the piston head is normally guided in a line of movement which corresponds to the axis of the cylinder bore.

It has been found that it is almost impossible as a practical matter, to provide accurate alignment between the aforementioned line of movement of the above noted point of contact and the axis of the cylinder, and that normally the line of movement is angularly disposed, at least to a small extent, with respect to the axis of the cylinder. When the axis of the cylinder and the line of movement of the end of the piston rod are misaligned, that is, angularly disposed to each other, side bearing forces are produced and applied to the piston head and piston rod. These side bearing forces tend to move the piston head and piston rod laterally within the cylinder and increase the bearing pressure at which the piston head engages the bore in the cylinder. This increase in pressure causes undesirable wear of the piston head as well as the cylinder bore in which it moves, thereby greatly shortening the life of the device.

Accordingly, an important object of the present invention is the provision of a new and improved piston and cylinder device wherein the aforementioned wear is minimized by use of a piston which can cock in the cylinder to accommodate angular movement of the piston rod but which will not cock in response to fluid pressure in the cylinder when the piston rod of the device is operatively connected to a member.

A principal object of the present invention is the provision of a new and improved piston and cylinder device wherein the piston head may tilt in the bore of the cylinder to allow a piston rod fixed thereto to move angularly as the outer end of the piston rod is constrained to move along a line different from the cylinder axis.

Another object of the present invention is the provision of a new and improved piston and cylinder device for moving a machine member wherein the piston head thereof is provided with resilient sealing and bearing means which prevents leakage of actuating fluid around this piston head and permits the piston head to tilt universally within the cylinder bore to allow the piston rod to move angularly as the outer end of the piston rod is constrained to move along a line different from the cylinder axis.

Yet another object of the present invention is to provide a new and improved piston-cylinder structure in which the piston which is fixed to the piston rod is supported in the cylinder bore for tilting movement by resilient means which has a part that functions to provide a seal between the cylinder and piston and a part which provides the bearing support for the piston.

A further object of the present invention is the provision of a new and improved piston and cylinder structure having a floating ring encircling the piston rod, which ring is frictionally engaged between support members and is free to move transverse to the axis of the piston rod between the support members upon movement of the piston rod in a direction generally transverse to the axis thereof.

A still further object of the present invention is the provision of a new and improved piston and cylinder device for moving a machine member wherein the device includes a piston head which can tilt within the cylinder bore to minimize the aforementioned side bearing forces, fluid pressure means for moving the piston head, and means for providing a pressure cushion in advance of the piston head even if the piston head is tilted to retard the movement of the piston head near the end of the piston stroke.

A further object of the present invention is the provision of a new and improved piston and cylinder device for moving a machine member wherein the device includes a means for providing an air cushion to retard movement of the piston head near the end of the piston stroke, which means is simple in construction, reliable in operation, and durable, and includes resilient disk means for blocking air vents and means for positioning the disk means in blocking position at a predetermined time in relation to the movement of the piston head.

Further objects and advantages of the present invention will be apparent to those skilled in the art to which it relates from the following detailed description of the preferred embodiment thereof made with reference to the accompanying drawings wherein:

FIG. 1 is a sectional view of an apparatus including a piston and cylinder device embodying the present invention and taken approximately on the section line 1—1 of FIG. 2;

FIG. 2 is a fragmentary sectional view of the device of FIG. 1 taken approximately on the section line 2—2 thereof;

FIG. 3 is a partial sectional view with parts in elevation of a modified piston and cylinder device embodying the present invention;

FIG. 5 is a sectional view of the device of FIG. 1 taken approximately on the section line 5—5 thereof.

Figure 4:
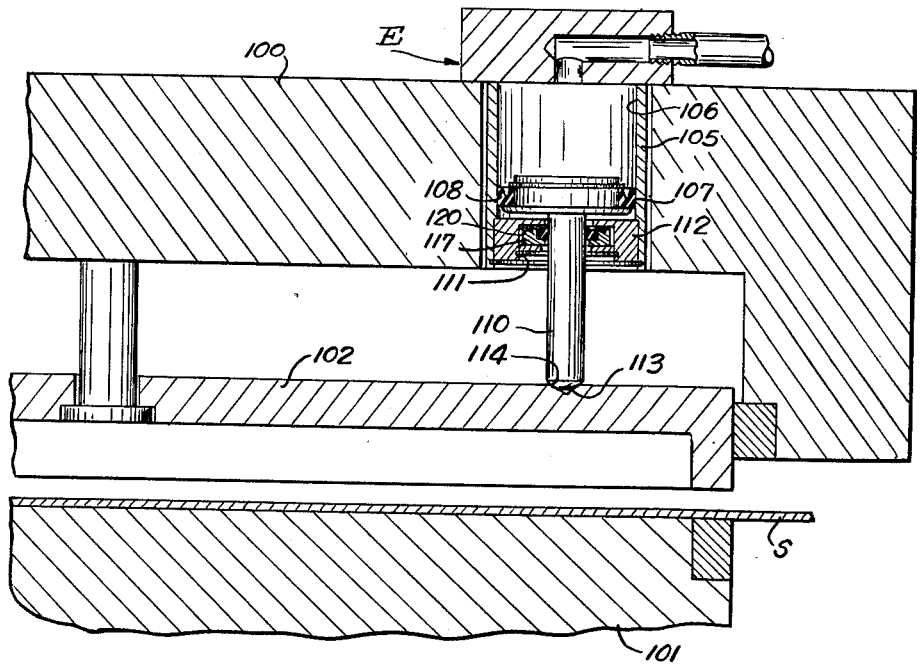
FIG. 4 is a sectional view of another apparatus including a modified piston and cylinder device embodying the present invention.

The present invention may be embodied in numerous piston and cylinder devices usable in a variety of machine environments. FIG. 1 of the drawings shows, by way of example, a piston and cylinder device A which embodies the present invention. The device A is rigidly secured in a suitable manner to the frame 10 of machine B. The machine B is provided with spaced guide members 12 and 13 which support and guide the movement of a machine member 14 relative to the frame 10 along a fixed line of movement. The machine member 14 is reciprocated within the guides 12 and 13 along the aforementioned line of movement by the device A.

The piston and cylinder device A comprises a cylinder section 15 having a finished bore 16 therein. The cylinder 15 is provided with cylinder heads 17 and 18 which are suitably secured to opposite ends of the cylinder 15. A non-guided piston head 20 is fitted to the bore 16 of the cylinder 15, divides the cylinder 15 into two chambers, and normally lies in a plane which extends at an angle of 90° to the axis of the cylinder 15. The piston head 20 is moved axially of the cylinder 15 within the bore 16 by fluid pressure and is secured to a piston rod 21 intermediate the ends thereof. The piston rod 21 is positioned centrally in the cylinder 15 and extends axially thereof. The piston rod 21, as viewed in FIG. 1 of the drawings, extends from a surface 23 of the piston head 20 through passageway or bore 23' in the cylinder head 17, and the outer extremity thereof is secured to the machine member 14 by a universal connection 14' which includes a ball and socket and permits the piston rod to pivot universally relative to the member 14. The right end portion 24 of the piston rod 20 extends a short distance from a surface 25 of the piston head 20.

The fluid pressure for moving the piston head 20 is applied to the piston head through the cylinder heads 17 and 18. The cylinder heads 17 and 18 are provided with fluid conduits 30 and 31, respectively, through which fluid flows into and from the cylinder 15. The flow of fluid through the conduits 30 and 31 is suitably controlled by a conventional valve, not shown, which supplies fluid to the conduit 31 and vents the conduit 30, thus increasing the pressure on the surface 25 of the piston head 20 when it is desired to move the piston head and the piston rod 21 to the left, as viewed in FIG. 1, and supplies fluid to the conduit 30 and vents the conduit 31, thus increasing the pressure on the surface 23 of the piston head 20 when it is desired to move the piston head and the piston rod 21 to the right, as viewed in FIG. 1.

The piston head 20 is a sectional head and comprises a plurality of circular disk members 35, 36, 37. The disk member 35 is provided with a skirt portion 38 which encircles the peripheral edge of the disk member adjacent the surface 23 and projects radially beyond the peripheral surface of the disk member 35. The disk member 37 is similar to disk member 35 and has a skirt portion 40 which projects radially beyond the periphery of the disk member adjacent the surface 25. The disk member 36 is located in an annular channel 41 formed by the abutting disks 35 and 37 and projects beyond the periphery of the disks 35 and 37. These various disks are secured on the piston rod 21 by retaining means which preferably includes suitable split rings.

The disk 36 and the projecting portions 38 and 40 provide a pair of annular channels in the periphery of the piston head 20. A pair of rings 43 of elastically deformable material are positioned in these channels with the disk 36 forming a backing or backstop member therefor and the projecting portions 38 and 40 providing a front stop member therefor. The rings 43 engage the bore 16 of the cylinder 15 and comprise a sealing means providing fluid tight contact between the piston head 20 and the bore 16. Moreover, the sealing rings 43 of the preferred embodiment support the weight of the piston head and piston rod.

The rings 43 each comprise a base or heel portion 43a and a U or cup-shaped portion 43b with the U-shaped portions 43b of the rings facing the pressure chambers of the cylinder. The U-shaped portions 43b provide a flange portion 44 which extends outwardly from the base portion. The flange portion 44 engages the bore 16 of the cylinder 15 and provides a fluid tight contact therebetween. The base or heel portions 43a preferably are cylindrical in their natural configuration and preferably have an outside diameter slightly smaller than the inside diameter of the cylinder to provide a slight clearance when the piston head is coaxial with the cylinder. The base, or heel portion, will however, bear against the cylinder to support the piston head as the side thrust is applied to the piston or if it tilts. The base portion and the flange portion of the sealing rings 43 are preferably made of a suitable elastically deformable material having the properties of firmness and high resistance to abrasion. Numerous materials may be used for this purpose but preferably resilient plastic material such as a polyurethane compound marketed under the trademark "Disogrin" is utilized.

Since the rings 43 are elastically deformable, the cross section of heel portions 43a will deform and the piston head 20 may tilt within the cylinder bore 16 to vary the angle that the piston head makes with the axis of the bore. The resiliency of the heel portions 43a of each ring 43 is not as great as that of the flange portions 44, since the U-shaped portions 43b provide greater resiliency as well as an area for the fluid pressure in the cylinder to act against to urge the flange portion 44 into sealing engagement with the cylinder.

When the outer end of the piston rod is moved laterally, the parts of the heel portions 43a of the rings which are moved toward the cylinder wall will first bear against the cylinder in the direction of thrust and will then deform to allow the piston head to cock in the cylinder bore as the outer end of the piston rod is moved laterally. It will be noted, however, that the cocking is controlled since the piston head is fixed to the end of the piston rod. Otherwise the piston head would be free to cock in response to pressure in the cylinder and jamming would be a problem. A tilted position of the piston is shown in FIG. 1 in dot-dash lines. The tilting of the piston head does not break the seal between the cylinder and the head since the sealing flange portions 44 of the rings 43 will be continuously urged outwardly into engagement with the cylinder by the pressure in the cylinder chambers and by their molded flare contour which maintains a seal between the cylinder and the piston head when a low pressure is acting on the piston head.

When the line of movement of the member 14 and the cylinder are misaligned the outer end of the piston will move with its point of connection to the member 14 but the ball and socket connection will allow universal pivotal movement at this point so that the piston rod may move angularly relative to the member 14 and since the piston head 20 is free to tilt in a universal manner about a point on the axis of the cylinder by reason of the rings 43 the piston rod can move angularly to compensate for misalignment of the line of movement of the member 14 and the axis of the cylinder, unless otherwise constrained. The line of movement of member 14 and the axis of the cylinder being angularly disposed will intersect and lie in a common plane and the tilting of the piston head is in a direction parallel to the aforementioned plane.

To accommodate the aforementioned angular movement of the piston rod 21 the cylinder head 17, through which the rod passes, is provided with a floating sealing means 45 for the rod. The sealing means 45 encircles the piston rod 21 and is supported in the cylinder head 17 so that it will "float" or move with the piston rod when the latter is moved transversely to the axis of the cylinder bore 16. The sealing means 45 comprises a sealing ring 46 encircling the piston rod 21 in fluid-tight engagement with the periphery thereof and retaining means comprising a ring member 47 encircling the sealing ring 46 and holding the sealing ring 46 against outward axial movement.

The sealing means 45 is disposed in a cavity provided by an oversized counterbore 48 at the outer end of bore 23' in the cylinder head 17 through which the piston extends. The counterbore 48 is larger in diameter than the sealing means 45 and has a bottom 50 which extends perpendicular to the axis of the cylinder 15 into the passageway 23', and the sealing means is held against the bottom 50 by a washer member 51 engaging the outer side of the sealing means and held in place in the counterbore by a snap ring 52. The washer member 51 applies a compressing force to an O-ring 54 in the side of the member 47 against the bottom 50 to assure a seal between the member 45 and bottom 50.

As is apparent from the drawings, the sealing means 45, when centered on the axis of the cylinder does not engage the outer peripheral wall of the counterbore 48, but rather is spaced therefrom. Moreover, the sealing means while held in the cavity by friction will yield and move transverse to the axis of the cylinder 15 within the counterbore 48 and the O-ring 54 will maintain fluid-tight contact with the bottom of the counterbore 48 at all times. In the event of misalignment between the axis of the bore 16 and the line of movement of the member 14 the piston head 20 will tilt and the piston rod will move relative to the cylinder head 17 in a direction transverse to the axis of the bore 16, as above described. This movement of the piston rod causes the sealing means 45 to move in the cavity perpendicular to the axis of the cylinder bore and will maintain sealing engagement with the piston rod.

When built for an operation, the device A is preferably provided with means for establishing an air pressure cushion in advance of the piston head 20. The air pressure cushion functions to decelerate the moving mass thereby retarding movement of the piston head 20 and bringing the piston head 20 and actuated member 14 to a gentle stop at the end of the stroke of the piston head.

The preferred means for establishing an air pressure cushion in advance of the piston head 20 includes a disk member 60, 61 on opposite sides of the piston head. The disk member 60 is slidable on the piston rod 21 adjacent the surface 23 and is normally held spaced from the surface 23 of the piston head 20. The disk member 61 is slidable on the portion 24 of the piston rod 21 adjacent the surface 25 and is normally held spaced from the surface 25 of the piston head 20.

Each disk member 60, 61 preferably comprises a metal disk 62 having a resilient, flexible disk 63 suitably bonded or secured to and extending circumferentially beyond the metal disk 62. The disk members 60, 61 are adapted to be moved with the piston rod 21 into respective blocking positions wherein the disks are adapted to block the conduits 30 and 31, respectively. FIG. 1 shows the resilient disk 63 of disk member 61 in a position blocking the conduit 31.

As the piston head 20 moves towards the left as viewed in FIG. 1, the disk 60 is moved therewith into the position wherein disk 63 thereof blocks the conduit 30. The disk 60 is moved with the rod by magnetic means 70 suitably secured to the piston rod 21 for movement therewith. The magnetic means 70 comprises an annular permanent magnet suitably mounted on a collar which is secured to the piston rod 21. The magnetic means 70 is positioned on the piston rod 21 so that upon movement thereof the magnetic means 70 will engage the metal disk 62 of the disk means 60 and will magnetically attach the disk means 60 to the piston rod 21.

The disk means 60 moves to the left, as it is viewed in FIG. 1, with the piston rod 21 until the disk means 60 engages the cylinder head 17, at which time the outer peripheral portion of the disk 63 blocks the conduit 30 and a permanent magnet 71 mounted in the cylinder head 17 engages the metal disk 62 and holds the disk 63 in this blocking position. Continued movement of the piston rod 21 towards the left as viewed in FIG. 1 causes the disk 60 to be stripped away from the magnetic means 70 and the magnetic means 70 moves into an enlarged portion 73 of the passageway 23' in the cylinder head 17. Upon this continued movement of the piston head, the column of air in the chamber between the piston head 20 and the cylinder head 17 is vented through needle valve 17a. The disk member 60 and magnetic means 70 are mounted on the piston rod 21 in a manner which permits air to flow therebetween. In order to provide the cushioning action the needle valve will normally restrict the flow of air therethrough and the continued movement of the piston head will cause a pressure build-up between the piston head and cylinder head 17.

In a similar manner, magnetic means 74, comprising a permanent magnet mounted on the portion 24 of the piston rod 21, engages the disk member 61 as the piston rod moves to the left from the position shown in FIG. 1 and causes the disk member to be magnetically attached to the piston rod for movement therewith. When the piston rod is moving from left to right and the disk member 61 engages the cylinder head 18, suitable magnetic means 75 mounted in the cylinder head 18 engages the disk 62 and holds the disk 61 blocking the conduit 31. Further movement of the piston rod towards the right will then cause the magnetic means 74 to move into the bore 79 in the cylinder head 18 and air vented through needle valve 18a is regulated by the setting of the valve to regulate the pressure cushion.

The mechanism for moving the disk members 60 and 61 and the structure of the disks 60 and 61 may take many forms other than that described above. A further embodiment of the present invention illustrating a different type of disk member and a different mechanism for moving the disk members into closed engagement with the conduits is illustrated in FIG. 3. The reference characters used in FIG. 1 are used to designate corresponding structure in FIG. 3.

The disk members 60, 61, illustrated in FIG. 3, are suitable resilient disks which are substantially firm and yet flexible to a certain extent. The means for moving and holding the disk members 60 and 61 illustrated in FIG. 3 comprises conical springs 80 and 81. One end of the springs 80 and 81 is positioned in recess 83 in the piston head and the springs extend between the piston head 20 and the disk members 60, 61. The springs 80, 81 normally hold the disk members 60, 61 against stops 84, 85, respectively, secured to the piston rod 21, and cause the disks 60, 61, respectively, to move with the piston rod until the disks engage the cylinder heads 17, 18, respectively. When these disks engage the cylinder heads continued movement of the piston rod causes the springs 80, 81 to be compressed into the recess 83 corresponding thereto to provide the air cushion as discussed above while the stops continue to move with the piston rod. The disc members 60, 61 are mounted on the piston rod so that air will flow therebetween. Thus, after the discs engage the cylinder heads, the air between the discs and the cylinder heads will slowly flow between the piston rod and the disc members, as described above in connection with FIG. 1.

As stated hereinbefore, the needle valves 17a and 18a are adjustable so that the amount and rate of cushioning can be controlled thereby. The needle valves 17a and 18a also function to cause the initial movement of the piston head towards the right and left, respectively. When the piston head 20 is positioned adjacent cylinder head 17 and pressure is supplied to the conduit 30 the needle valve 17a connects the supply of fluid to the interior of the cylinder 15 to supply pressure between the cylinder head 17 and the surface 23 on the piston head. It should be apparent that fluid cannot immediately flow through the conduit 30 into the cylinder 15, since it is blocked by the disk 63 which is being held in blocking position by the magnetic means 71.

The disk member 60 and magnetic means 70 are mounted on the piston rod 21 in a manner which permits the air supplied by needle valve 17a to pass therebetween, as mentioned above. However, the disk could be grooved or have an opening therethrough for this purpose. The air supplied by needle valve 17a thus causes the piston head to move away from disk member 60, which is held by magnet 71.

As soon as the piston head moves towards the right and away from the disk member 60 air pressure in the conduit 30 deflects the outer rim section of the disk 63, as illustrated in dot-dash lines in FIG. 3, to allow free flow of air into the cylinder 15 through conduit 30. The disk member 60 is then engaged by the magnetic means 70 and moved bodily away from the conduit 30.

In the same manner, the needle valve 18a connects the supply of fluid pressure to the interior of the cylinder 15 and causes initial movement of the piston head 20 towards the left, as viewed in FIG. 1. As the piston head 20 moves toward the left and away from the disk member 61, air pressure in the conduit 31 deflects the outer rim section of the disk 63 to allow free flow of air into the cylinder 15. When the piston head 20 and piston rod 21 have moved a sufficient distance the magnetic means 74 engages the disk member 61 and separates the disk 61 from the cylinder head 18. The disk 61 will remain in engagement with the magnetic means 74 and will move with the piston rod 21 in the manner described above.

The conduits 30, 31 through which air is directed into and from the cylinder 15 in the embodiment shown in FIG. 1 comprise a series of passageways connected to an arcuate chamber 95 located in the cylinder heads 17 and 18. The conduits 30, 31 in the embodiment illustrated in FIG. 3 are formed by a sleeve member 96 positioned in the bore 97 in the cylinder heads. The sleeve member 96 is spaced from the bore 97 a sufficient distance to provide a passageway for the flow of air therebetween.

FIG. 4 shows, by way of example, a piston and cylinder device E which also embodies the present invention. The piston and cylinder device E is in fact a cushioning device which is used with relatively movable first and second metal forming dies in the place of springs to provide a biasing or cushioning force on one of the dies or a pressure pad normally associated with one of the dies. The operation of the device E is similar to the operation of the fluid spring disclosed in my copending application 149,405, filed on November 1, 1961.

The device E is rigidly secured for movement with a movable die 100. The movable die 100 cooperates with a fixed die 101 to bend the edge of the sheet S which is positioned on the fixed die 101. The movable die 100 has a pressure pad or workholder 102 mounted thereon and movable therewith. The device E is mounted in an opening in the die 100 in a conventional manner and includes a cylinder section 105 having a finished bore 106. A piston head 107 moves axially within the cylinder bore 106. Resilient sealing means 108 encircles the piston head 107 and engages the bore 106 of the cylinder 105. The sealing means 108 is similar to the sealing means 43 shown in FIG. 1.

A piston rod 110 is secured to the piston head 107 and extends through bore 111 in the cylinder head 112. The end of the piston rod 110 opposite the end secured to the piston head 108 has a convex surface 113 which engages a conical seat 114 in the workholder 102.

As the movable die 100 moves toward the fixed die 101 the workholder 102 will engage the sheet S before the work engaging portions of the die 100 engage the sheet. Continued movement of the die 100 after the workholder 102 engages the sheet causes the workholder to move relative to the die 100. Movement of the workholder 102 relative to the die 100 causes the piston rod 110 and the piston head 107 to move vertically within the bore 106 against the bias of fluid pressure located above the piston head 107 in the cylinder 105.

In the event of misalignment between the axis of the cylinder 105 and the fixed line of movement of the point of contact between the workholder 102 and the piston rod 110 the piston rod 110 will move transversely of the axis of the cylinder 105 through the action of the universal connection comprised of the conical seat 114 and the convex portion 113 and the piston head 107 will tilt within the cylinder 105.

The cylinder head 112 through which the piston rod 110 extends is provided with a bearing means 115 which permits the aforementioned movement of the piston rod transverse to the axis of the cylinder. The floating bearing 115 is constructed in a similar manner to the sealing means 45 shown in FIG. 1 and in view of the similarity will not be described in detail. It should be noted, however, that the bearing 115 includes a ring member 117 which engages the piston rod 110, which ring member can move in a cavity 120 in a direction perpendicular to the axis of the bore of the cylinder 105.

While the preferred embodiments of the present invention have been described in considerable detail, the invention is not limited to the particular constructions shown and it is my intention to cover hereby all adaptations, modifications, and uses thereof which come within the practice of those skilled in the art to which the invention relates.

Having described my invention, I claim:

1. A piston and cylinder device comprising a cylinder having an axially extending bore therein, a piston head supported in said bore for universal pivotal movement relative to the axis of said cylinder and dividing said bore into two chambers, said piston head being movable axially in said bore, and tiltable therein, means connecting at least one of said chambers to fluid pressure to cause movement of said piston head in said bore, conduit means for connecting the other of said chambers to air pressure lower than said fluid pressure for venting said other chamber and for connecting said other chamber to fluid pressure, a piston rod extending from said piston head outwardly and having its inner end supported for angular movement with said piston head, nonmetallic resilient disk means movable into blocking position wherein said disk means blocks the flow of fluid through said conduit means, said disk means being movable relative to said piston head, means for moving said disk means into blocking position in timed relation to movement of said piston head in a first direction, and securing means for maintaining said disk means in blocking position during continued movement of said piston head in said first direction and until said piston head moves in a second direction opposite said first direction and the fluid pressure in said conduit means forces said disk means away from said blocking position.

2. A piston and cylinder device comprising a cylinder with an axially extending bore therein, a piston head positioned in said bore and dividing said bore into two chambers, said piston head being movable axially within said bore through a stroke, means for supplying fluid air pressure to one of said chambers located on one side of said piston head, conduit means for connecting the other of said chambers located on the other side of said piston head to an air pressure lower than said fluid air pressure to cause movement of said piston head toward said other side and alternatively to fluid pressure to cause said piston head to move away from said other side, nonmetallic resilient disk means movable into blocking position wherein said disk means blocks the flow of air through said conduit means when said piston head moves toward said other side, said disk means being movable relative to said piston head, means for moving said disk means into blocking position prior to the end of said stroke of said piston head, and securing means for maintaining said disk means in blocking position during continued movement of said piston head and until the piston head moves in a direction away from said other side and the fluid pressure in said conduit means forces said disk means away from said blocking piston.

3. A piston and cylinder device as defined in claim 2, wherein said securing means comprises a conical spring located between said disk means and said piston head and compressible therebetween upon said continued movement of said piston head.

4. A piston and cylinder device having a cylinder with an axially extending bore therein, a piston head positioned in said bore and dividing said bore into two chambers, said piston head being movable axially within said bore through a stroke, means for supplying fluid air pressure to one of said chambers located on one side of said piston head, venting means for connecting the other of said chambers located on the other side of said piston head to an air pressure lower than said fluid air pressure to cause movement of said piston head toward said other side, resilient disk means movable into blocking position wherein said disk means blocks the flow of air through said venting means, said disk means being movable relative to said piston head, first magnetic means mounted on said piston rod and movable therewith, said disk means being at least partially formed of magnetic material and located in the path of movement of said magnetic means, said magnetic means being spaced from said piston head to move said disk means into blocking position prior to the end of said stroke of said piston head, and second magnetic means for maintaining said disk means in blocking position during movement of said piston head after said disk means is located in blocking position.

References Cited in the file of this patent

UNITED STATES PATENTS

| | | |
|---|---|---|
| 2,186,537 | Salisbury | Jan. 9, 1940 |
| 2,267,931 | Leonard | Dec. 30, 1941 |
| 2,556,698 | Loewe | June 12, 1951 |
| 2,642,845 | Stevens | June 23, 1953 |
| 2,815,004 | Droman | Dec. 3, 1957 |
| 2,985,358 | Lee et al. | May 23, 1961 |
| 3,034,482 | Rader | May 15, 1962 |
| 3,067,726 | Williams | Dec. 12, 1962 |
| 3,070,070 | Trevor | Dec. 25, 1962 |